United States Patent [19]

Gorbatov et al.

[11] 3,922,367

[45] Nov. 25, 1975

[54] PREPARATION FOR IMPARTING SMOKE TO MEAT PRODUCTS

[76] Inventors: Vasily Matveevich Gorbatov, prospekt Mira, 74, kv. 57; Konstantin Dmitrievich Sinitsin, Polyarnaya ultisa, 56, kv. 57; Nina Nikolaevna Krylova, B. Gnezdnikovsky pereulok, 10, kv. 630; Julia Nazarovna Lyaskovskaya, Tverskoi bulvar, 7/2, kv. 28; Valentina Pavlovna Volovinskaya, ulitsa Akademika Pavlova, I.P., 40, kv. 70; Klavdia Ivanovna Bazarova, Dubninskaya ulitsa, 39, korpus 1, kv. 134; Ljudmila Ivanovna Solovieva, B. Cherkizovskaya ulitsa, 12, korpus 3, kv. 30; Rimma Igorevna Khlamova, Zhigulevskaya ulitsa 8, kv. 67, all of Moscow, U.S.S.R.

[22] Filed: Apr. 3, 1974

[21] Appl. No.: 457,719

[52] U.S. Cl. ............... 426/536; 426/534; 426/650
[51] Int. Cl.² ......................................... A23L 1/232
[58] Field of Search ....... 426/61, 62, 143, 221, 223, 426/224, 264, 342, 362, 492

[56] References Cited
UNITED STATES PATENTS
3,806,609    4/1974    Goblik et al. ...................... 426/221

*Primary Examiner*—Hyman Lord
*Attorney, Agent, or Firm*—Haseltine, Lake & Waters

[57] ABSTRACT

A preparation for imparting the smoke and smell of fumed food to meat products consists of the following components in % by weight: carbonyl compounds: furfural 0.05–0.8, valeric aldehyde 0.0002–0.05, dihydroxyacetone 0.0003–0.004, diacetyl 0.0001–0.001; organic acids: acetic acid 0.2–1.5, formic acid .0.01–0.1, propionic acid 0.03–0.25, butyric acid 0.001–0.03, valeric acid 0.01–0.1, caproic acid 0.003–0.05, heptanoic acid 0.001–0.01; phenols: guaiacol 0.0002–0.01, o-cresol- 0.0002–0.01; bases: ethylamine 0.00005–0.0008, p-hexylamine 0.00005–0.0008; water or 1% aqueous solution of ethanol — the balance up to 100.

2 Claims, No Drawings

PREPARATION FOR IMPARTING SMOKE TO MEAT PRODUCTS

The present invention relates to preparations to be used for imparting the smoke and smell of fumed food to meat products and may find application in the meat industry in making boiled sausages and the like meat products.

Known in the art are preparations for imparting the smoke and smell of fumed food to meat products, such as fuming preparations obtained from the products of pyrolysis of wood. These preparations comprise carbonyl compounds organic acids, phenols and a solvent. Thus, one prior art preparation of such type comprises in % by weight:

| | |
|---|---|
| furfural | 0.12–0.17 |
| acetic acid | 0.6 –0.9 |
| propionic acid | 0.05–0.15 |
| butyric acid | 0.08–0.2 |
| valeric acid | 0.03–0.1 |
| caproic acid | 0.01–0.09 |
| heptanoic acid | 0.02–0.06 |
| guaiacol | |
| m-cresol | 0.018–0.022 |
| p-cresol | |
| methylguaiacol | 0.006–0.009 |
| phenol | |
| o-cresol | 0.018–0.65 |

The disadvantages of these known preparations consist in an unstable composition and the presence of useless substances. In addition, the method of producing these preparations during the processing of the wood products is complicated and uneconomical.

It is an object of the present invention to provide a preparation for imparting the smell and smoke of fumed food to meat products which has a stable composition and does not contain useless substances.

Another object of the invention is to provide a preparation which can be produced by a simple production method.

The above objects are accomplished by a preparation for imparting the smoke and smell of fumed food comprising carbonyl compounds, organic acids, phenols, bases and a solvent, according to the invention consists of the following components in % by weight: furfural 0.05–0.8, valeric aldehyde 0.0002–0.05, dihydroxyacetone 0.0003–0.004, diacetyl 0.0001–0.001; organic acids: acetic acid 0.2–1.5; formic acid 0.01–0.1, propionic acid 0.03–0.25, butyric acid 0.001–0.03, valeric acid 0.01–0.1, caproic acid 0.003–0.05, heptanoic acid 0.001–0.01; phenols: guaiacol 0.0002–0.01, cresol 0.0002–0.01; bases: ethylamine 0.00005–0.0008, p-hexylamine 0.00005–0.0008; water or 1% ethyl alcohol the balance up to 100.

The most preferable composition of the preparation in % by weight is the following:

| | |
|---|---|
| furfural | 0.17 |
| valeric aldehyde | 0.002 |
| dihydroxyacetone | 0.0012 |
| diacetyl | 0.0002 |
| acetic acid | 0.9 |
| formic acid | 0.06 |
| propionic acid | 0.14 |
| butyric acid | 0.016 |
| valeric acid | 0.06 |
| caproic acid | 0.008 |
| heptanoic acid | 0.006 |
| guaiacol | 0.001 |
| o-cresol | 0.001 |
| p-hexylamine | 0.00016 |
| ethylamine | 0.00016 |
| water | the balance up to 100. |

The preparation is made in the following manner.

Acetic acid (80%) and propionic acid are charged into a reactor by means of metering devices. Then furfural is added and the mixture is thoroughly stirred. After that a mixture of substances (formic, butyric, valeric, caproic and heptanoic acids, phenols, amines and carbonyl compounds) prepared in an intermediate reactor in 10% acetic acid is introduced into the reactor. 10% acetic acid is prepared using 8–9 l of the total quantity of water. The balance of the water is added to the resulting mixture in the reactor.

All the substances charged into the main reactor are stirred, and the resulting preparation is poured into a container. Then the preparation is fed for batching and packaging.

In order to ensure convenient packaging, transporting and storage, the preparation may be produced in the concentrated form. To obtain the working solution the concentrated preparation is diluted in the ratio 1:50.

The preparation is a light yellow liquid having a specific smell like the smell of vinegar and a weak acidic taste.

In practical application, the preparation is added to the sausage-meat in an amount of up to 0.5 wt.%. The treatment of meat products is conducted by the methods of dipping, spraying or injection.

The preparation according to the invention is produced by a very simple method and is economically advantageous as compared with the known fuming preparations, it has a stable composition and does not contain useless substances.

The invention will be better understood from the following examples of the composition of the preparation for imparting the smoke and smell of fumed food to meat products.

EXAMPLE 1

The preparation consists of the following components in grams:

| | |
|---|---|
| furfural | 600 |
| valeric aldehyde | 0.2 |
| dihydroxyacetone | 0.4 |
| diacetyl | 0.1 |
| acetic acid | 300 |
| formic acid | 100 |
| propionic acid | 250 |
| butyric acid | 20 |
| valeric acid | 20 |
| caproic acid | 80 |
| heptanoic acid | 40 |
| guaiacol | 70 |
| o-cresol | 0.3 |
| p-hexylamine | 0.08 |
| ethylamine | 0.08 |
| water | the balance up to 100.000. |

The preparation is prepared as follows:

270 g of 80% acetic acid and 250 g of propionic acid are charged into a reactor. Then 600 g of furfural are added and the mixture is stirred. Then a mixture consisting of 100 g of formic acid, 20 g of butyric acid, 80 of valeric acid, 40 g of caproic acid and 70 g of heptanoic acid, 0.3 of guaiacol and 0.3 g of o-cresol, 0.08 g of ethylamine and 0.08 g of p-hexylamine, 0.2 g of valeric aldehyde, 0.4 g of dihydroxyacetone and 0.1 g of diacetyl dissolved in 10% acetic acid is introduced into the reactor. 100 kgs of the preparation ready for use are obtained in the form of a light yellow liquid having a specific smell like that of vinegar and a weak acidic taste.

| | | |
|---|---|---|
| Density at 20°C | g/cm³ | 1.0 |
| Total acidity | wt. % | 0.90 |
| Phenol content | wt. % | 0.006 |
| Content of carbonyl compounds referred to furfural | wt. % | 0.6 |

EXAMPLE 2

The preparation consists of the following components in grams:

| | |
|---|---|
| furfural | 350 |
| valeric aldehyde | 50 |
| dihydroxyacetone | 3 |
| diacetyl | 0.02 |
| acetic acid | 109.2 |
| formic acid | 10 |
| propionic acid | 130 |
| butyric acid | 10 |
| valeric acid | 40 |
| caproic acid | 4 |
| heptanoic acid | 10 |
| guaiacol | 0.8 |
| o-cresol | 0.2 |
| p-hexylamine | 0.2 |
| ethylamine | 0.1 |
| 1% aqueous solution of ethanol | the balance up to 100,000 |

The preparation is obtained by the following method:

1080 g of acetic acid and 130 g of propionic acid are charged into a reactor, and 350 g of furfural are added. Then a mixture is prepared which consists of 10 g of butyric acid, 40 g of valeric acid, 4 g of caproic acid, 10 g of heptanoic acid, 10 g of formic acid, 0.8 g of guaiacol, 0.2 g of o-cresol, 0.1 g of ethylamine, 0.2 g of p-hexylamine, 50 g of valeric aldehyde, 3 g of dihydroxyacetone, 0.2 g of diacetyl, and this mixture is dissolved in 120 ml of 10% acetic acid.

The resulting mixture is introduced into the reactor, and the mixture contained therein is thoroughly stirred. 1% aqueous solution of ethanol is added as solvent. 100 kg of the preparation ready for use are obtained in the form of a light yellow liquid having a smell like that of vinegar and a weak acidic taste.

| | | |
|---|---|---|
| Density at 20°C | g/cm³ | 1.0 |
| Total acidity | wt. % | 1.3 |
| Phenol content | wt. % | 0.001 |
| Content of carbonyl compounds referred to furfural | wt. % | 0.4 |

EXAMPLE 3

The preparation consists of the following components in grams:

| | |
|---|---|
| furfural | 200 |
| valeric aldehyde | 20 |
| dihydroxyacetone | 1.2 |
| diacetyl | 0.2 |
| acetic acid | 900 |
| formic acid | 60 |
| propionic acid | 140 |
| butyric acid | 16 |
| valeric acid | 60 |
| caproic acid | 8 |
| heptanoic acid | 6 |
| guaiacol | 1 |
| o-cresol | 1 |
| p-hexylamine | 0.16 |
| ethylamine | 0.16 |
| water | the balance up to 100,000 |

The preparation is obtained as described in Example 1.

The preparation is in the form of a light yellow liquid having a smell lilke that of vinegar and a weak acidic taste.

| | | |
|---|---|---|
| Density at 20°C | g/cm³ | 1.0 |
| Total acidity | wt. % | 1.2 |
| Phenol content | wt. % | 0.002 |
| Content of carbonyl compounds referred to furfural | wt. % | 0.22 |

What is claimed is:

1. A preparation for imparting the smoke and smell of fumed food to meat products consisting of the following components in % by weight:

| | |
|---|---|
| carbonyl compounds: | |
| furfural | 0.05–0.8 |
| valeric aldehyde | 0.0002–0.05 |
| dihydroxyacetone | 0.0003–0.004 |
| diacetyl | 0.0001–0.001 |
| organic acids: | |
| acetic acid | 0.2–1.5 |
| formic acid | 0.01–0.1 |
| propionic acid | 0.03–0.25 |
| butyric acid | 0.001–0.03 |
| valeric acid | 0.01–0.1 |
| caproic acid | 0.003–0.05 |
| heptanoic acid | 0.001–0.01 |
| phenols: | |
| guaiacol | 0.0002–0.01 |
| o-cresol | 0.0002–0.01 |
| bases: | |
| ethylamine | 0.00005–0.0008 |
| p-hexylamine | 0.00005–0.0008 |
| water or 1% aqueous solution of ethanol | the balance up to 100. |

2. A preparation as claimed in claim 1 consisting of the following components in % by weight:

| | |
|---|---|
| furfural | 0.17 |
| valeric aldehyde | 0.002 |
| dihydroxyacetone | 0.0012 |
| diacetyl | 0.0002 |
| acetic acid | 0.9 |
| formic acid | 0.06 |
| propionic acid | 0.14 |
| butyric acid | 0.016 |
| valeric acid | 0.06 |
| caproic acid | 0.008 |
| heptanoic acid | 0.006 |
| guaiacol | 0.001 |
| o-cresol | 0.001 |
| p-hexylamine | 0.00016 |
| ethylamine | 0.00016 |
| water | the balance up to 100. |

* * * * *